United States Patent Office 2,759,213
Patented Aug. 21, 1956

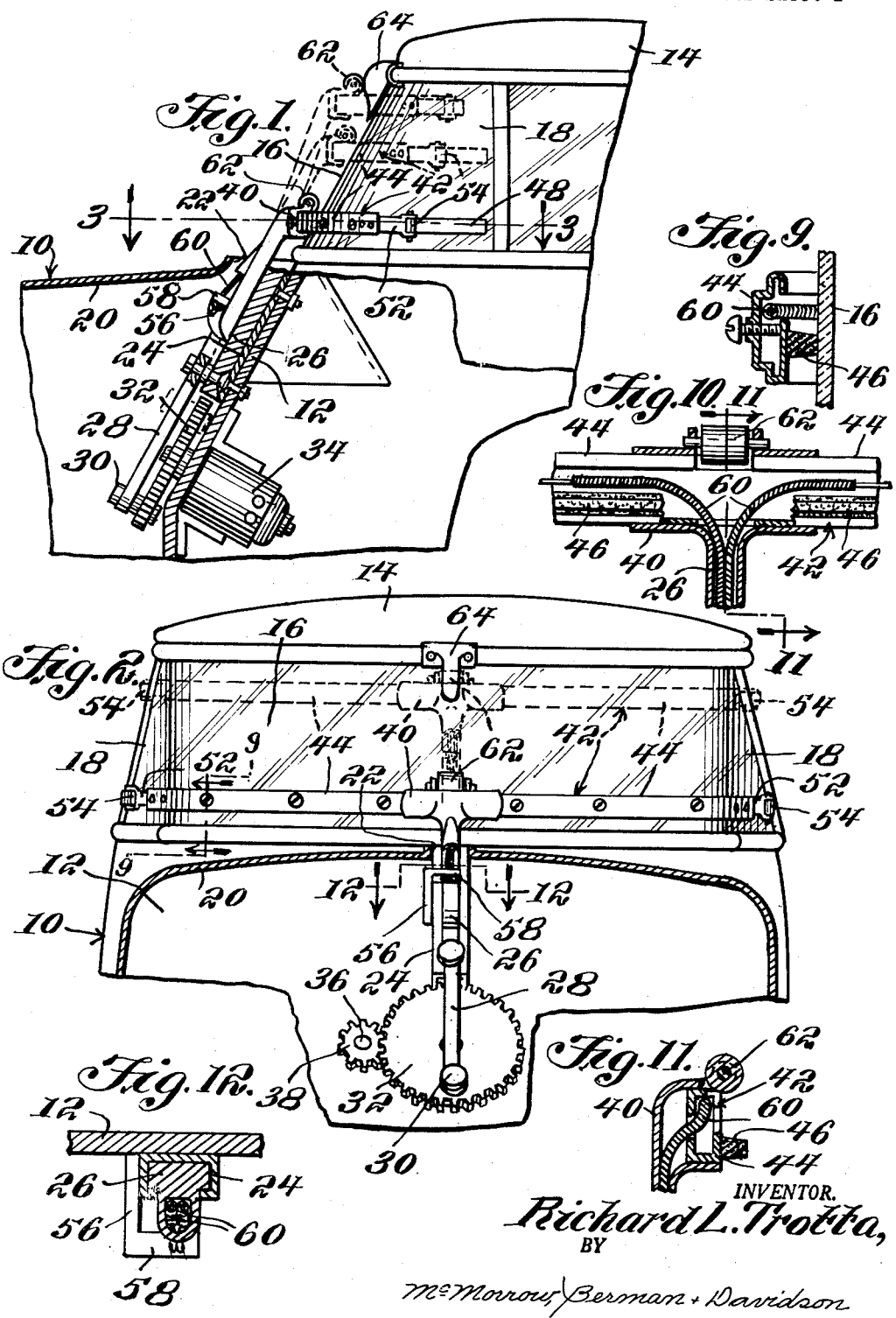

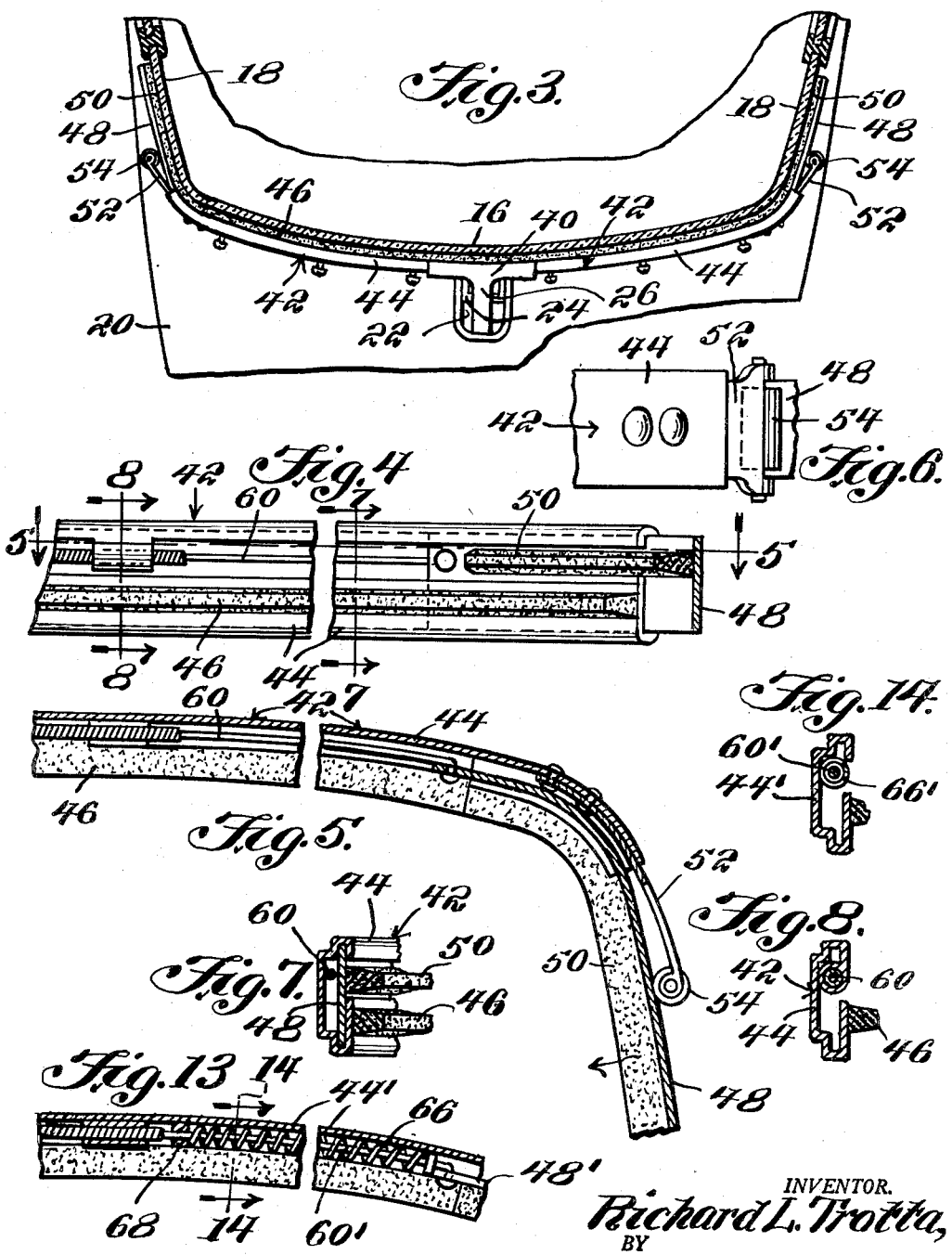

2,759,213

WINDSHIELD WIPER

Richard L. Trotta, Baltimore, Md.

Application June 1, 1954, Serial No. 433,357

3 Claims. (Cl. 15—251)

This invention relates to a windshield wiper and more particularly to a wiper for a windshield of the "wraparound" type.

The primary object of the invention is to preserve the visibility through a windshield during periods of inclement weather and to thereby contribute to the safety of the driver and passengers of a vehicle.

Another object is to assure clear vision through the sides of the windshield as well as through the major front portion thereof.

The above and other objects may be attained by employing this invention which embodies among its features a carriage mounted to reciprocate in an upwardly inclined path adjacent the front of a windshield, a resilient transversely extending cross bar carried by the carriage for movement therewith adjacent the front of the windshield, said cross bar being bowed to conform to the external contour of the windshield, a wiper carried by the cross bar and engaging the windshield, and means mounted below the windshield and operatively connected to the carriage for reciprocating it.

Other features include a lift cam mounted adjacent the windshield in the path of movement of the carriage for operatively engaging the cross bar and moving the wiper out of engagement with the windshield as the carriage approaches its upper limit of travel.

Other features include bowed extensions carried by the cross bar and extending outwardly therefrom adjacent opposite ends thereof, wipers carried by the extensions and extending outwardly therefrom for contact with the windshield, and means carried by the cross bar and bearing on the extensions for holding the wipers in yielding contact with the windshield.

Still further features include bowed extensions carried by the cross bar for movement longitudinally adjacent opposite ends thereof, wipers carried by the extensions for movement therewith, springs carried by the cross bar and engaging the extensions for moving them outwardly under yielding pressure, and cables anchored below the windshield and operatively connected to the extensions for moving said extensions and contracting them relative to the cross bar as the cross bar approaches the top of the windshield.

In the drawings:

Figure 1 is a fragmentary diagrammatic side view of the motor vehicle showing portions thereof in section and this improved windshield wiper mounted thereon;

Figure 2 is a fragmentary front view of the windshield showing the hood of the vehicle partially in section and illustrating the wiper and operating mechanism therefor in its lowered position;

Figure 3 is a horizontal sectional view taken substantially on the line 3—3 of Figure 1;

Figure 4 is a fragmentary sectional view of the inner side of the cross bar;

Figure 5 is a fragmentary sectional view taken substantially on the line 5—5 of Figure 4;

Figure 6 is a fragmentary enlarged detail view of the end of the cross bar showing a spring mounted roller in detail;

Figure 7 is a fragmentary sectional view taken substantially on the line 7—7 of Figure 4;

Figure 8 is a fragmentary sectional view taken substantially on the line 8—8 of Figure 4;

Figure 9 is a fragmentary sectional view taken substantially on the line 9—9 of Figure 2;

Figure 10 is a fragmentary sectional view through the carriage and cross bar;

Figure 11 is a fragmentary sectional view taken substantially on the line 11—11 of Figure 10;

Figure 12 is an enlarged fragmentary sectional view taken substantially on the line 12—12 of Figure 2.

Figure 13 is a fragmentary sectional view through a portion of the cross bar showing a modified form of extension actuating means; and Figure 14 is a sectional view taken susbtantially on the line 14—14 of Figure 13.

Referring to the drawings in detail, a vehicle designated generally 10 is equipped with a conventional dashboard or fire wall 12, top 14 and windshield 16. As illustrated in the drawings, the windshield 16 is of the modern wrap-around type having side wings 18. The vehicle is also provided with a cowl 20 of conventional form. The structure so far defined is conventional in modern day automotive vehicles and forms no part of this invention except in combination therewith.

Formed in the cowl 20 substantially midway between opposite sides thereof is an opening 22, and mounted on the dashboard or fire wall 12 immediately beneath the opening 22 in the cowl 20 is an upwardly extending guide 24 in which is mounted for sliding movement a carriage 26. The carriage 26 has connected thereto adjacent its lower end a connecting rod 28 which is pivotally connected as at 30 to a drive gear 32 of relatively large diameter. Carried by the fire wall 12 is a drive motor 34, the drive shaft 36 of which projects through the fire wall and carries a drive pinion 38 which has meshing engagement with the gear 32 so that when the motor 34 is energized the gear 32 will rotate to cause the carriage 26 to reciprocate in the guide 24 through the opening 22 in the cowl 20. Carried by the carriage 26 and extending outwardly from opposite sides thereof adjacent its upper end is a cross head 40 to which are attached the windshield wipers to be more fully hereinafter described.

The windshield wipers above referred to is designated generally 42 and comprises bowed cross arms 44 which extend outwardly from opposite ends of the cross head 40 and are curved transversely to follow the curvature of the exterior of the windshield 16, as will be readily understood upon reference to Figure 3. As illustrated in Figures 4 and 5, the arms 44 are substantially channel-shaped in cross section and carried on the inner side of each cross bar 44 is a wiper 46 of pliable material such as soft rubber of the type commonly employed in squeegee type windshield wipers. Mounted for longitudinal sliding movement in the ends of the bars 44 remote from the head 40 are slides 48 of flexible resilient material such as spring steel and carried by the extensions 48 and projecting toward the sides 18 of the windshield 16 are pliable wipers 50 which, as illustrated in Figure 4, are offset longitudinally from the wiper 46 to enable the extensions 48 to move through opposite ends of the windshield wiper 42. Resilient arms 52 are carried by and extend outwardly from opposite ends of the wiper blade 42 and carry at their outer ends rollers 54 which bear on the extensions 48 to yieldingly advance them into contact with the side portions or wings 18 of the windshield 16.

Secured to the guideway 24 beneath the cowl 20 is a bracket 56 carrying an arm 58 which extends across the carriage 26 and has secured thereto cables 60 which extend through the carriage 26 and cross head 40 and through the cross arms 44, as illustrated in Figure 10. The ends of the cables remote from the arm 58 are connected to the extensions 48 so that as the blade 42 moves upwardly along the windshield 16 toward the top 14, pull will be exerted on the extensions 48 to contract them into their respective arms 44 so as to avoid interference of the extensions with the vehicle posts adjacent the ends of the windshield extensions 18.

Carried by the carriage 26 and extending upwardly therefrom adjacent the cross head 40 is a roller 62, and secured to the top 14 of the vehicle and projecting downwardly therefrom into the path of movement of the roller 62 is a cam lug 64 which, when the windshield wiper approaches its uppermost length of travel, will engage the roller 62 to lift the windshield wiper away from the windshield and permit water which has been moved upwardly by the wiper to flow downwardly over the face of the windshield and to be discharged therefrom upon the down stroke of the wiper.

In the modified form of the invention, illustrated in Figure 13, in addition to being connected to a cable 60', each extension 48' has bearing thereagainst one end of a compression coiled spring 66, the opposite end of each of which engages a stop 68 carried by the respective wiper arm 44' to yieldingly urge its respective extension 48' outwardly, and like the cables 60, the cables 60' are anchored adjacent the guideway carrying the cross head (not shown).

In use, it will be evident that as the motor 34 is energized, the gear 32 will be rotated to cause the connecting rod 28 to reciprocate the carriage 26 and move the cross head 40 upwardly and downwardly over the outer face of the windshield. As the cross head 40 approaches the upper end of the windshield, the roller 62 engages the cam lug 64 and moves the head 42 away from the windshield. As the head is moved away from the windshield, the wipers 46 and 50 will be moved out of contact with the windshield 16 to allow what water has been accumulated above the wipers 46 and 50 to flow downwardly over the windshield to be removed therefrom upon the down stroke of the carriage. Obviously, as the carriage reciprocates, the cables 60 will cause the extensions 48 to reciprocate adjacent the ends of the arms 44 so as to move them clear of the posts carried by the vehicle adjacent opposite ends of the windshield.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

1. A windshield wiper comprising a carriage mounted to reciprocate in an upwardly inclined path adjacent the front of a windshield, a resilient transversely extending cross bar carried by the carriage for movement therewith adjacent the front of the windshield, said cross bar being bowed to conform to the external contour of the windshield, a wiper carried by the cross bar and engaging the windshield, means mounted below the windshield and operatively connected to the carriage for reciprocating it, bowed extensions carried by the cross bar and extending outwardly therefrom adjacent opposite ends thereof, wipers carried by the extensions and extending outwardly therefrom for contact with the windshield, and means carried by the cross bar and bearing on the extensions for holding the wipers in yielding contact with the windshield.

2. A windshield wiper comprising a carriage mounted to reciprocate in an upwardly inclined path adjacent the front of a windshield, a resilient transversely extending cross bar carried by the carriage for movement therewith adjacent the front of the windshield, said cross bar being bowed to conform to the external contour of the windshield, a wiper carried by the cross bar and engaging the windshield, means mounted below the windshield and operatively connected to the carriage for reciprocating it, bowed extensions carried by the cross bar for movement longitudinally adjacent opposite ends thereof, wipers carried by the extensions for movement therewith, springs carried by the cross bar and engaging the extensions for moving them outwardly under yielding pressure, and cables anchored below the windshield and operatively connected to the extensions for moving said extensions against the effort of the springs and contracting them relative to the cross bar as the cross bar approaches the top of the windshield.

3. A windshield wiper comprising a carriage mounted to reciprocate in an upwardly inclined path adjacent the front of a windshield, a resilient transversely extending cross bar carried by the carriage for movement therewith adjacent the front of the windshield, said cross bar being bowed to conform to the external contour of the windshield, a wiper carried by the cross bar and engaging the windshield, means mounted below the windshield and operatively connected to the carriage for reciprocating it, bowed extensions carried by the cross bar for movement longitudinally adjacent opposite ends thereof, wipers carried by the extensions for movement therewith, springs carried by the cross bar and engaging the extensions for moving them outwardly under yielding pressure, cables anchored below the windshield and operatively connected to the extensions for moving said extensions against the effort of the springs and contracting them relative to the cross bar as the cross bar approaches the top of the windshield, and spring mounted rollers carried by the cross bar and extending outwardly therefrom in contact with the extensions for advancing the wipers carried by the extensions into contact with the windshield under yielding pressure.

References Cited in the file of this patent

UNITED STATES PATENTS

| 932,051 | McKee | Aug. 24, 1909 |
| 2,042,456 | Cain | June 2, 1936 |
| 2,629,891 | Greene | Mar. 3, 1953 |

FOREIGN PATENTS

| 470,493 | Canada | Jan. 2, 1951 |
| 639,535 | Great Britain | June 28, 1950 |
| 667,253 | Great Britain | Feb. 27, 1952 |
| 820,156 | France | July 26, 1937 |